US007417088B2

(12) United States Patent
Ahn et al.

(10) Patent No.: US 7,417,088 B2
(45) Date of Patent: Aug. 26, 2008

(54) THERMOPLASTIC RESIN COMPOSITION

(75) Inventors: Tae-bin Ahn, Daejeon (KR); Hyun-taek O, Jeonnam (KR); Jung-tae Park, Yeosu-si (KR); Min-jung Kim, Daejeon (KR); Keun-hoon Yoo, Yeosu-si (KR)

(73) Assignee: LG Chem, Ltd. (KR)

(*) Notice: Subject to any disclaimer, the term of this patent is extended or adjusted under 35 U.S.C. 154(b) by 177 days.

(21) Appl. No.: 11/511,581

(22) Filed: Aug. 29, 2006

(65) Prior Publication Data

US 2007/0203293 A1 Aug. 30, 2007

(51) Int. Cl.
*C08L 51/04* (2006.01)
*C08L 53/00* (2006.01)

(52) U.S. Cl. .......................................... 525/71; 525/85

(58) Field of Classification Search .................. 525/71, 525/85

See application file for complete search history.

(56) References Cited

U.S. PATENT DOCUMENTS 6,448,342 B2 9/2002 Kurata et al.
2003/0162895 A1* 8/2003 Gaggar et al. ................. 525/70
2004/0175593 A1* 9/2004 Davis et al. ................. 428/515

FOREIGN PATENT DOCUMENTS

DE 1260135 2/1968

* cited by examiner

*Primary Examiner*—Jeffrey C Mullis
(74) *Attorney, Agent, or Firm*—Cantor Colburn LLP

(57) ABSTRACT

The present invention relates to a thermoplastic resin composition, more precisely, a thermoplastic resin composition with enhanced impact resistance, gloss, weather resistance and scratch resistance, compared with the conventional thermoplastic resin compositions, by containing an acrylate-styrene-acrylonitrile (ASA) graft copolymer, an aromatic vinyl compound and vinyl cyan compound copolymer, an alkyl methacrylate/aromatic vinyl compound/vinyl cyan compound terpolymer and a di-block copolymer (aromatic vinyl compound/vinyl cyan compound—alkyl methacrylate/aromatic vinyl compound/vinyl cyan compound).

17 Claims, No Drawings

THERMOPLASTIC RESIN COMPOSITION

This application claims the benefit of the filing date of Korean Patent Application No. 10-2005-0079584 filed on Aug. 29, 2005 in the Korean Intellectual Property Office, the disclosure of which is incorporated herein in its entirety by reference.

TECHNICAL FIELD

The present invention relates to a thermoplastic resin composition, more precisely, a thermoplastic resin composition with enhanced impact strength, gloss, weather resistance and scratch resistance, compared with the conventional thermoplastic resin.

BACKGROUND ART

High impact strength thermoplastic resin is prepared by mixing the styrene-acrylonitrile copolymer with rubber particles. In general, the high impact strength thermoplastic resin is prepared by graft-copolymerization of styrene and acrylonitrile in the presence of rubber and by mixing the graft product with hard matrix resin containing another styrene-acrylonitrile copolymer.

The high impact strength thermoplastic resin exhibits different characteristics according to the used rubber. The rubber that has been added to the acrylonitrile-butadiene-styrene (ABS) polymer is the butadiene polymer.

The ABS polymer has excellent impact strength even at a very low temperature but poor weather resistance and aging resistance. Thus, to produce a resin with excellent impact strength and at the same time excellent weather resistance and aging resistance, it is essential to eliminate the unsaturated ethylene polymer from the graft copolymer. Therefore, the acrylate-styrene-acylonitrile (ASA) polymer cross-linked with the alkyl acrylate rubber polymer is preferred. The ASA polymer has been widely applied to glossy colored outdoor products including garden furniture, boat, land mark, street light cover, etc.

German Patent No. 1,260,135 describes the preparing method of the ASA polymer having excellent weather resistance and aging resistance. The core used for the ASA polymer is 150~800 nm in mean diameter and is a cross-linked acrylate large-caliber polyacrylate latex with narrow size distribution. The polymer containing the large-caliber polyacrylate latex exhibits enhanced notched impact strength, higher hardness and reduced contraction, compared with the polymer containing the small-caliber polyacrylate latex. However, the large-caliber graft copolymer has problems of poor levels of gloss and scratch resistance, compared with the small-caliber graft copolymer.

According to U.S. Pat. No. 6,448,342, a monomer comprising aromatic vinyl compound, vinyl cyan compound and alkyl methacrylate is graft-copolymerized in the presence of butadiene rubber particles and then the terpolymer comprising aromatic vinyl compound, vinyl cyan compound and alkyl methacrylate is used as a hard matrix to produce butadiene-based rubber-reinforced thermoplastic resin composition for laser marking having excellent transparency and white chromogenic property. The transparent butadiene-based rubber-reinforced thermoplastic resin has excellent gloss and scratch resistance but reduced weather resistance and impact resistance.

One of the problems of the conventional resin compositions is the unbalance among properties, such as impact-resistance, weather resistance, gloss and scratch resistance, meaning that this property is excellent but the other property is poor.

DISCLOSURE

[Technical Problem]

It is an object of the present invention, to overcome the above problems of the conventional art, to provide a thermoplastic resin composition with enhanced impact resistance, gloss, weather resistance and scratch resistance, compared with the conventional thermoplastic resin composition.

[Technical Solution]

To achieve the above object, the present invention provides a thermoplastic resin composition characteristically comprising:

a) an acrylate-styrene-acrylonitrile (ASA) graft copolymer;

b) an aromatic vinyl compound/vinyl cyan compound copolymer;

c) an alkyl methacrylate/aromatic vinyl compound/vinyl cyan compound terpolymer; and d) a di-block copolymer (aromatic vinyl compound/vinyl cyan compound—alkyl methacrylate/aromatic vinyl compound/vinyl cyan compound).

Hereinafter, the present invention is described in detail.

The thermoplastic resin composition of the present invention characteristically comprises an acrylate-styrene-acrylonitrile (ASA) graft copolymer; an aromatic vinyl compound/vinyl cyan copolymer; an alkyl methacrylate/aromatic vinyl compound/vinyl cyan compound terpolymer; and a di-block copolymer (aromatic vinyl compound/vinyl cyan compound—alkyl methacrylate/aromatic vinyl compound/vinyl cyan compound).

The acrylate-styrene-acrylonitrile (ASA) graft copolymer of (a) is prepared by the graft-polymerization of an alkyl acrylate rubber polymer with aromatic vinyl compound and vinyl cyan compound.

The alkyl acrylate rubber polymer monomer preferably has $C_2$~$C_8$ alkyl, which is one of or the mixture of butyl acrylate or ethyl hexyl acrylate.

The glass transition temperature of the alkyl acrylate rubber polymer is preferably −70~−20° C. When the glass transition temperature is lower than −70° C., whitening is observed. In the meantime, when the glass transition temperature is higher than −20° C., impact resistance at low temperature is reduced.

The alkyl acrylate rubber polymer is preferably 100~600 nm in mean diameter. The mean diameter of less than 100 nm reduces impact resistance, while the mean diameter of more than 600 nm reduces hardness and gloss.

The alkyl acrylate rubber polymer is preferably included by 30~70 weight part for 100 weight part of the ASA graft copolymer.

The aromatic vinyl compound can be selected from a group consisting of styrene, α-methylstyrene, p-methylstyrene and styrene monomer derivatives of vinyl toluene, and the preferable content thereof is 15~55 weight part for 100 weight part of the ASA graft copolymer.

The vinyl cyan compound can be acrylonitrile or methacrylonitrile or a mixture of the two. The preferable content of the vinyl cyan compound is 5~35 weight part for 100 weight part of the ASA graft copolymer.

It is well understood by those in the art that the acrylate-styrene-acrylonitrile graft copolymer can additionally include the generally acceptable emulsifiers, initiators, grafting agents, cross-linking agents, molecular weight regulators or electrolytes, in addition to the above components.

The acrylate-styrene-acrylonitrile graft copolymer can be prepared by the conventional emulsion polymerization.

The prepared acrylate-styrene-acrylonitrile graft-copolymer can be recovered in powder form after coagulating and spray-drying. Particularly, a coagulant is added to the acrylate-styrene-acrylonitrile graft copolymer prepared by emulsion polymerization to coagulate polymer particles remaining in the latex, followed by washing, dehydrating and drying to give the graft copolymer in dried powder form.

It is preferred that the acrylate-styrene-acrylonitrile graft copolymer is added by 30~70 weight part to 100 weight part of the thermoplastic resin composition. When the graft copolymer is included by less than 30 weight part, impact resistance and weather resistance are reduced. In the meantime, when the graft copolymer is included by more than 70 weight part, gloss, scratch resistance and hardness are reduced.

The aromatic vinyl compound-vinyl cyan compound copolymer of (b) is included in the thermoplastic resin composition of the invention as a hard matrix resin.

The preferable mixing ratio of the aromatic vinyl compound to vinyl cyan compound is 8:2~6:4. If the two compounds are mixed out of the ratio, chemical resistance and plasticity are reduced.

To prepare the aromatic vinyl compound-vinyl cyan compound copolymer, same components as used for the production of the acrylate-styrene-acrylonitrile graft copolymer can be used. In particular, the styrene-acrylonitrile copolymer is preferred as the aromatic vinyl compound-vinyl cyan compound copolymer.

The preferable content of the aromatic vinyl compound/vinyl cyan compound copolymer is 10~50 weight part for 100 weight part of thermoplastic resin composition. If the content is less than 10 weight part, impact resistance is reduced. On the contrary, if the content is more than 50 weight part, weather resistance, gloss and scratch resistance are reduced.

The alkyl methacrylate/aromatic vinyl compound/vinyl cyan compound terpolymer of (c) comprises 50~90 weight part of alkyl methacrylate, 10~40 weight part of aromatic vinyl compound and 1~15 weight part of vinyl cyan compound for 100 weight part of the terpolymer.

The alkyl methacrylate is either methyl methacrylate or ethyl methacrylate or a mixture of the two.

The aromatic vinyl compound and the vinyl cyan compound can be selected from the same components as for the graft-copolymerization of acrylate-styrene-acrylonitrile. In particular, the methyl methacrylate-styrene-acrylonitrile copolymer is preferably used as the terpolymer.

The preferable content of the alkyl methacrylate/aromatic vinyl compound/vinyl cyan compound terpolymer is 10~50 weight part for 100 weight part of the thermoplastic resin composition. If the content is less than 10 weight part, weather resistance, gloss and scratch resistance are reduced. On the contrary, if the content is more than 50 weight part, impact resistance is reduced.

The di-block copolymer of (d) of the invention is compatible with the above acrylate-styrene-acrylonitrile graft copolymer and the aromatic vinyl compound/vinyl cyan compound copolymer, suggesting that this copolymer is also functioning to enhance such properties as impact resistance, gloss, weather resistance and scratch resistance.

The di-block copolymer is prepared by the copolymerization of the aromatic vinyl compound/vinyl cyan compound block and the alkyl methacrylate/aromatic vinyl compound/vinyl cyan compound block.

The di-block copolymer increases the compatibility of each component of the thermoplastic resin composition. Particularly, the di-block copolymer harbors the aromatic vinyl compound/vinyl cyan compound block which is highly compatible with the acrylate-styrene-acrylonitrile graft copolymer and the alkyl methacrylate/aromatic vinyl compound/vinyl cyan compound block which is highly compatible with the alkyl methacrylate/aromatic vinyl compound/vinyl cyan compound terpolymer, so that it can reside interface of the two polymers with increasing the interfacial adhesion, leading to the improvement of impact resistance, gloss, weather resistance and scratch resistance.

The preferable weight ratio of aromatic vinyl compound to vinyl cyan compound in the aromatic vinyl compound/vinyl cyan compound block is 8:2~6:4. The alkyl methacrylate/aromatic vinyl compound/vinyl cyan compound block is preferably composed of 50~90 weight part of alkyl methacrylate, 10~40 weight part of aromatic vinyl compound and 1~15 weight part of vinyl cyan compound for the total of 100 weight part of the block.

The preferable weight ratio of the aromatic vinyl compound/vinyl cyan compound block to the alkyl methacrylate/aromatic vinyl compound/vinyl cyan compound block, to prepare the di-block copolymer, is 2:8~8:2. If the mixing ratio of the two blocks is out of the range, compatibility decreases.

Generally, ion polymerization has been used to regulate the structure and molecular weight of a polymer. However, ion polymerization can only be applied to some specific monomers with requiring difficult conditions, which is thus limited in industrial use. On the other hand, living radical polymerization is applicable to various monomers with asking mild conditions, which is to inhibit termination reaction resulted from the paring-up of propagating species or give-and-take responses between same species by regulating free-radical level to be low based on the reversible equilibrium between active species and dormant species.

The di-block copolymer can be prepared by living radical polymerization methods such as ATRP (atom transfer radical polymerization), NMP (nitroxide-mediated polymerization) and RAFT (reversible addition-fragmentation chain transfer polymerization). Herein, RAFT is particularly used, which is not limited in monomers, requires low polymerization temperature and does not require an independent purification process.

The di-block copolymer is preferably 50,000~100,000 g/mol in weight average molecular weight, which favors fluidity and compatibility.

The content of the di-block copolymer is not limited but is preferably 1~10 weight part for 100 weight part of the thermoplastic resin composition. If the content is less than 1 weight part, impact resistance is reduced. On the contrary, if the content is more than 10 weight part, gloss, weather resistance and scratch resistance are reduced.

The thermoplastic resin composition comprising the above components can additionally include lubricants, antioxidants, UV stabilizers, pigments or inorganic fillers.

[Best Mode]

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Preparation of Acrylate-styrene-acrylonitrile Copolymer

Seed Preparation

To a reactor were added 10 weight part of butyl acrylate, 0.03 weight part of sodium dodecyl sulfate, 0.05 weight part of ethyleneglycol dimethacrylate, 0.02 weight part of allyl methacrylate, 0.1 weight part of sodium hydrogen carbonate and 60 weight part of distilled water. The reaction temperature was raised to 70° C. and then 0.05 weight part of potassium persulfate was added to start the reaction. The reaction continued for one hour to give seed in the mean diameter of 200 nm.

Preparation of Alkyl Acrylate Rubber Polymer

To the seed latex was added the mixture of 40 weight part of butyl acrylate, 0.5 weight part of sodium dodecyl sulfate, 0.1 weight part of ethyleneglycol dimethacrylate, 0.05 weight part allyl methacrylate, 50 weight part of distilled water and 0.05 weight part of potassium persulfate at 70° C. for three hours. Upon completion of the addition for 3 hours, polymerization was induced for one more hour, then the reaction was terminated. The mean diameter of the alkyl acrylate rubber polymer obtained from the reaction was 450 nm.

Preparation of Acrylate-styrene-acrylonitrile Graft Copolymer

To the alkyl acrylate rubber polymer was added the mixture of 36 weight part of styrene, 14 weight part of acrylonitrile, 1.5 weight part of potassium rosin acid, 0.1 weight part of potassium persulfate, 0.1 weight part of t-dodecyl mercaptan and 60 weight part of distilled water at 70° C. for three hours to induce polymerization. After the three hour serial mixture addition, the reaction temperature was raised to 75° C. to increase the polymerization conversion rate, followed by further reaction for one hour. Then, the temperature was lowered to 60° C. The mean diameter of the final acrylate-styrene-acrylonitrile graft copolymer was 550 nm.

Preparation of Acrylate-styrene-acrylonitrile Graft Copolymer Powder

The acrylate-styrene-acrylonitrile graft copolymer was coagulated by using calcium chloride aqueous solution at 80° C. under normal pressure, followed by aging at 95° C., washing, dehydrating and drying with hot air at 90° C. for 30 minutes to give the final acrylate-styrene-acrylonitrile graft copolymer powder having the moisture content of less than 0.5% and density of 0.4 g/cm$^3$.

Preparation of Di-Block Copolymer

Styrene and acrylonitrile were polymerized at the weight ratio of 7:3 to give the aromatic vinyl compound/vinyl cyan compound block. Methyl methacrylate, styrene and acrylonitrile were polymerized at the weight ratio of 7:2:1 to give the alkyl methacrylate/aromatic vinyl compound/vinyl cyan compound block. The above two blocks were mixed at the ratio of 1:1 to give the di-block copolymer having the weight average molecular weight of 70,000 g/mol. At this time, the di-block copolymer is preferably prepared by RAFT, one of living radical polymerization methods.

Preparation of Thermoplastic Resin Composition 40 weight part of the acrylate-styrene-acrylonitrile graft copolymer powder, 28 weight part of the styrene-acrylonitrile copolymer (92HR, LG Chem. Ltd.) as an aromatic vinyl compound/vinyl cyan compound copolymer, 28 weight part of the methyl methacrylate-styrene-acrylonitrile terpolymer (XT-500, LG Chem. Ltd.) as an alkyl methacrylate/aromatic vinyl compound/vinyl cyan compound terpolymer, 4 weight part of the di-block copolymer, 1 weight part of EBS (Sunkoo Chem. Ltd.) as a lubricant, 0.5 weight part of Irganox 1076 (Ciba-Geigy) as an antioxidant and 0.5 weight part of Tinuvin 327 (Ciba-Geigy) as an UV stabilizer were mixed, resulting in a thermoplastic resin composition.

EXAMPLE 2

A thermoplastic resin composition was prepared by the same manner as described in Example 1 except that 30 weight part of the methyl methacrylate-styrene-acrylonitrile terpolymer and 2 weight part of the di-block copolymer were used.

EXAMPLE 3

A thermoplastic resin composition was prepared by the same manner as described in Example 1 except that 50 weight part of the acrylate-styrene-acrylonitrile graft copolymer powder, 24 weight part of the styrene-acrylonitrile copolymer, 24 weight part of the methyl methacrylate-styrene-acrylonitrile terpolymer and 2 weight part of the di-block copolymer were used.

COMPARATIVE EXAMPLE 1

A thermoplastic resin composition was prepared by the same manner as described in Example 1 except that 40 weight part of the acrylate-styrene-acrylonitrile graft copolymer, 30 weight part of the styrene-acrylonitrile copolymer and 30 weight part of the methyl methacrylate-styrene-acrylonitrile terpolymer were used and the di-block-copolymer was excluded.

COMPARATIVE EXAMPLE 2

A thermoplastic resin composition was prepared by the same manner as described in Example 1 except that 80 weight part of the acrylate-styrene-acrylonitrile graft copolymer powder, 9 weight part of the styrene-acrylonitrile copolymer, 9 weight part of the methyl methacrylate-styrene-acrylonitrile terpolymer and 2 weight part of the di-block copolymer were used.

COMPARATIVE EXAMPLE 3

A thermoplastic resin composition was prepared by the same manner as described in Example 1 except that 40 weight part of the acrylate-styrene-acrylonitrile graft copolymer, 58 weight part of the styrene-acrylonitrile copolymer and 2 weight part of the di-block copolymer were used and the methyl methacrylate-styrene-acrylonitrile terpolymer was excluded.

COMPARATIVE EXAMPLE 4

A thermoplastic resin composition was prepared by the same manner as described in Example 1 except that 40 weight part of the acrylate-styrene-acrylonitrile graft copolymer, 58 weight part of the methyl methacrylate-styrene-acrylonitrile terpolymer and 2 weight part of the di-block copolymer were used and the styrene-acrylonitrile copolymer was excluded.

The thermoplastic resin compositions prepared in Examples 1~3 and Comparative Examples 1~4 were prepared as pellets respectively in a 200° C. cylinder using 40 pi extruding mixer. The pellets were extracted and samples for the property test were prepared.

The samples were tested for physical properties such as impact strength (Izod impact strength), scratch resistance (pencil hardness), gloss and weather resistance and the results are shown in Table 1.

1) Impact strength (Izod impact strength, ¼" notched at 23° C., kg·cm/cm)—measured according to ASTM D256.

2) Scratch resistance—measured by pencil hardness.

3) Gloss—measured by ASTM D523 at 45° standard.

4) Weather resistance—tested for 2,000 hours using Ci35A W-O-M (Xenon Lamp, Energy 0.35 w/$m^2$, Atlas), followed by measuring the color change by ΔE.

TABLE 1

| | Example | | | Comparative Example | | | |
|---|---|---|---|---|---|---|---|
| | 1 | 2 | 3 | 1 | 2 | 3 | 4 |
| Impact strength | 26 | 24 | 31 | 9 | 19 | 18 | 13 |
| Scratch resistance | B | B | B | 4B | 4B | 4B | 4B |
| Gloss | 99 | 99 | 97 | 88 | 65 | 76 | 83 |
| Weather resistance | 1.76 | 1.65 | 1.63 | 2.11 | 2.21 | 2.74 | 2.03 |

As shown in Table 1, according to the present invention, the thermoplastic resin compositions prepared in Examples 1~3, which comprises the acrylate-styrene-acrylonitrile (ASA) graft copolymer, the aromatic vinyl compound/vinyl cyan compound copolymer, the alkyl methacrylate/aromatic vinyl compound/vinyl cyan compound terpolymer and the di-block copolymer (aromatic vinyl compound/vinyl cyan compound—alkyl methacrylate/aromatic vinyl compound/vinyl cyan compound) at proper ratio, were confirmed to have excellent impact strength, scratch resistance, gloss and weather resistance, compared with those prepared in Comparative Examples 1~4.

INDUSTRIAL APPLICABILITY

The thermoplastic resin composition of the present invention has enhanced impact resistance, gloss, weather resistance and scratch resistance, compared with the conventional thermoplastic resin compositions.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A thermoplastic resin composition comprising:

a) an acrylate-styrene-acrylonitrile (ASA) graft copolymer;

b) an aromatic vinyl compound/vinyl cyan compound copolymer;

c) an alkyl methacrylate/aromatic vinyl compound/vinyl cyan compound terpolymer; and d) a di-block copolymer (aromatic vinyl compound/vinyl cyan compound—alkyl methacrylate/aromatic vinyl compound/vinyl cyan compound).

2. The thermoplastic resin composition according to claim 1, which comprises:

a) 30~70 weight part of the acrylate-styrene-acrylonitrile (ASA) graft copolymer;

b) 10~50 weight part of the aromatic vinyl compound/vinyl cyan compound copolymer;

c) 10~50 weight part of the alkyl methacrylate/aromatic vinyl compound/vinyl cyan compound terpolymer; and d) 1~10 weight part of the di-block copolymer (aromatic vinyl compound/vinyl cyan compound—alkyl methacrylate/aromatic vinyl compound/vinyl cyan compound) for 100 weight part of the thermoplastic resin composition.

3. The thermoplastic resin composition according to claim 1, wherein the acrylate-styrene-acrylonitrile (ASA) graft copolymer of a) is prepared by the polymerization of 30~70 weight part of an alkyl acrylate rubber polymer, 15~55 weight part of aromatic vinyl compound and 5~35 weight part of vinyl cyan compound for 100 weight part of the ASA graft copolymer.

4. The thermoplastic resin composition according to claim 3, wherein the alkyl acrylate rubber polymer is prepared by the polymerization of monomers selected from a group consisting of butyl acrylate, ethyl hexyl acrylate and a mixture of the two.

5. The thermoplastic resin composition according to claim 3, wherein the alkyl acrylate rubber polymer has a glass transition temperature of −70~−20° C. and a mean diameter of 100~600 nm.

6. The thermoplastic resin composition according to claim 3, wherein the aromatic vinyl compound is one or more compounds selected from a group consisting of styrene monomer derivatives of styrene, α-methylstyrene, p-methylstyrene and vinyl toluene.

7. The thermoplastic resin composition according to claim 3, wherein the vinyl cyan compound is selected from a group consisting of acrylonitrile, methacrylonitrile and a mixture of the two.

8. The thermoplastic resin composition according to claim 1, wherein the aromatic vinyl compound and the vinyl cyan compound are mixed at the weight ratio of 8:2~6:4 to prepare the aromatic vinyl compound/vinyl cyan compound copolymer of b).

9. The thermoplastic resin composition according to claim 1, wherein the alkyl methacrylate/aromatic vinyl compound/vinyl cyan compound terpolymer of c) is prepared by the copolymerization of 50~90 weight part of alkyl methacrylate, 10~40 weight part of aromatic vinyl compound and 1~15 weight part of vinyl cyan compound for 100 weight part of the terpolymer.

10. The thermoplastic resin composition according to claim 9, wherein the alkyl methacrylate is either methyl methacrylate or ethyl methacrylate or a mixture of the two.

11. The thermoplastic resin composition according to claim 1, wherein the alkyl methacrylate/aromatic vinyl compound/vinyl cyan compound terpolymer of c) is characteristically the methyl methacrylate-styrene-acrylonitrile copolymer.

12. The thermoplastic resin composition according to claim 1, wherein the di-block copolymer of d) includes the aromatic vinyl compound/vinyl cyan compound block and the alkyl methacrylate/aromatic vinyl compound/vinyl cyan compound block at the weight ratio of 2:8~8:2.

13. The thermoplastic resin composition according to claim 12, wherein the aromatic vinyl compound/vinyl cyan compound block contains aromatic vinyl compound and vinyl cyan compound at the weight ratio of 8:2~6:4.

14. The thermoplastic resin composition according to claim 12, wherein the 100 weight part of the alkyl methacrylate/aromatic vinyl compound/vinyl cyan compound block comprises 50~90 weight part of alkyl methacrylate, 10~40 weight part of aromatic vinyl compound and 1~15 weight part of vinyl cyan compound.

15. The thermoplastic resin composition according to claim 1, wherein the di-block copolymer is prepared by one or more living radical polymerization methods selected from a group consisting of ATRP (atom transfer radical polymerization), NMP (nitroxide-mediated polymerization) and RAFT (reversible addition-fragmentation chain transfer polymerization).

16. The thermoplastic resin composition according to claim 1, wherein the weight average molecular weight of the di-block copolymer is 50,000~100,000 g/mol.

17. The thermoplastic resin composition according to claim 1, wherein the thermoplastic resin composition additionally includes one or more additives selected from a group consisting of lubricant, antioxidant, UV stabilizer, pigment and inorganic filler.

* * * * *